W. P. & L. N. EVERETT & D. B. PATE.
CHURN.
APPLICATION FILED MAY 3, 1912.

1,048,669. Patented Dec. 31, 1912.

WITNESSES
T. T. Beall
W. S. L. Duvall

Inventors:
W. P. Everett,
L. N. Everett,
D. B. Pate,
by W. J. Duvall, Attorney.

UNITED STATES PATENT OFFICE.

WILLIAM P. EVERETT, LOONEY N. EVERETT, AND DAVID B. PATE, OF HORNBECK, LOUISIANA.

CHURN.

1,048,669.  Specification of Letters Patent.  Patented Dec. 31, 1912.

Application filed May 3, 1912. Serial No. 694,892.

*To all whom it may concern:*

Be it known that we, WILLIAM P. EVERETT, LOONEY N. EVERETT, and DAVID B. PATE, citizens of the United States, residing at Hornbeck, in the parish of Vernon and State of Louisiana, have invented certain new and useful Improvements in Churns, of which the following is a full and complete specification.
Our invention relates to that particular class of churns in which the dashers for agitating the milk and cream in the body or barrel are so arranged and driven as to turn in opposite directions, this motion being imparted by suitable gearing mechanism mounted above the churn body or barrel and connected to the dashers, respectively.

The primary object of our present invention is to provide improved operating mechanism for imparting the desired motion to the rotatable dashers, whereby they may be operated at a high rate of speed, or at a reduced rate, according to the condition of the material within the churn-body, the construction and arrangement of the mechanism, and bearings for the shafts, being such that the operation of churning may be effected very quickly and with the expenditure of a minimum amount of manual power.

Figure 1:
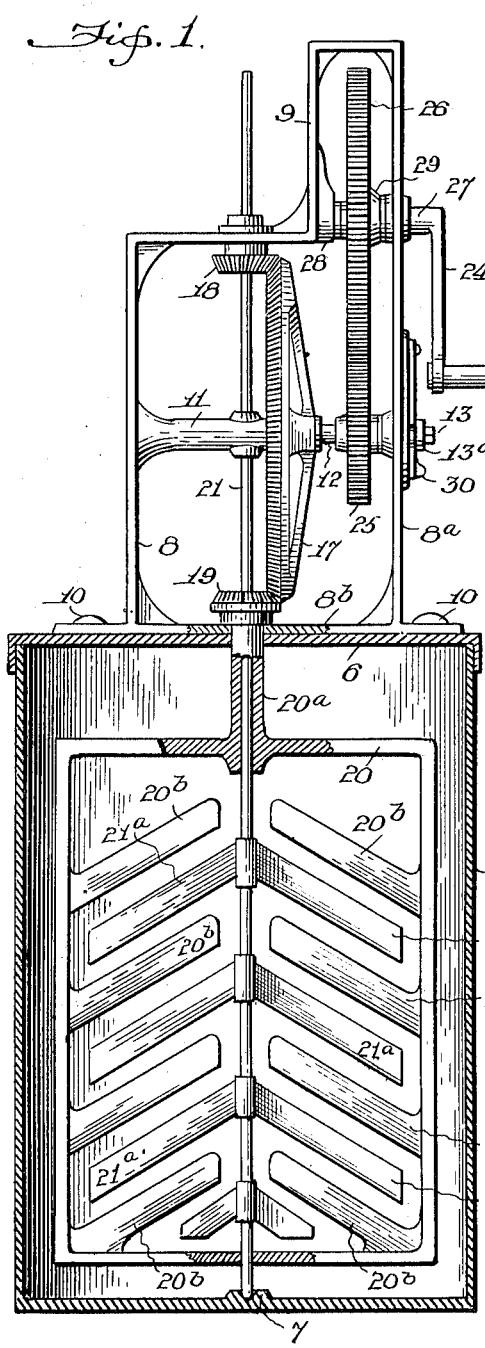
Figure 2:
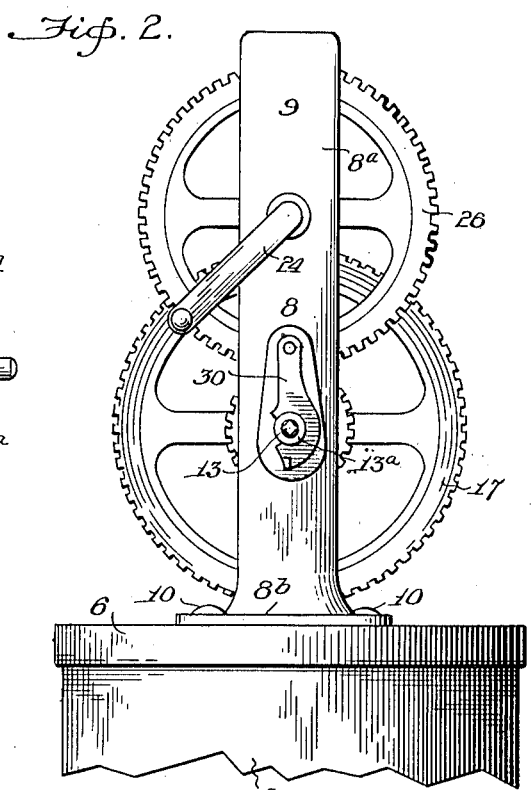
Figure 3:
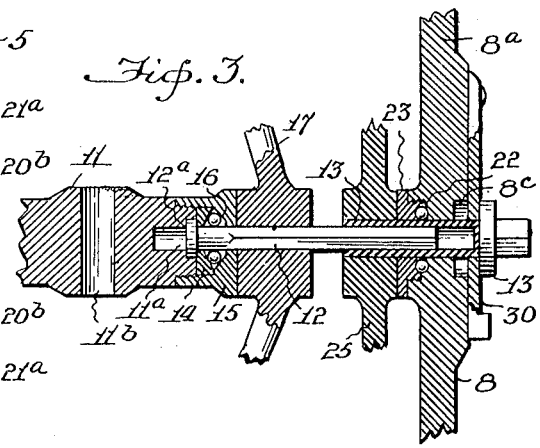

The construction and operation of our improved churn is hereinafter fully set forth, and what we claim as new is specifically set forth in the appended claims.
In the accompanying drawings, which form a part of this specification: Figure 1 is a side view, partly in section, showing a complete churn constructed in accordance with our invention. Fig. 2 is a front view of the upper part of the churn, including the operating mechanism. Fig. 3 is an enlarged detail sectional view, showing the main driving-shaft and parts carried thereby.

Like numerals of reference indicate like parts in all the figures of the drawings.

In the present instance the body 5 of the churn is cylindrical and provided at its upper end with a removable top 6, the latter supporting the operating mechanism and dashers, hereinafter described; whereby these parts may be all removed from the body of the churn to permit of free access thereto. At the center of the bottom of the churn-body there is a boss 7, having a recess or depression to form a seat for one of the dashers and properly center both dashers in said churn-body, as will be apparent.

The upright frame for supporting the operating mechanism consists of a main rectangular portion 8 and an upward extension 9 at the forward end thereof, the front plate or upright $8^a$ forming the front of both the main portion and extension. This supporting-frame is provided with a base plate $8^b$, which rests directly upon the cover or top 6 of the churn and is fastened thereto by rivets 10, or other suitable fastening means.

Projecting inwardly from the rear upright of the supporting-frame, at a suitable distance above the base-plate, is a bearing-arm 11, having a central opening $11^a$ at its end to receive one end of the main driving-shaft 12, the other end of said shaft being supported in a slidable sleeve 13, hereinafter particuarly referred to. The bearing-arm 11 is provided with a suitable ball-bearing for the shaft 12, consisting in the present instance of a bearing-ring 14, retaining-cap 15, and interposed anti-friction balls 16, the cap being threaded on the outer end of the arm as shown in Fig. 3, and the shaft provided with a collar $12^a$ to prevent longitudinal movement.

Keyed upon the driving-shaft 12, adjoining the end of the bearing-arm 11, is a large bevel gearwheel 17, in mesh with bevel pinions 18 and 19, at the upper and lower end, respectively, of the supporting-frame 8, the bevel-pinion 19 resting directly upon the base-plate $8^b$ and connected to the tubular extension $20^a$ of a rectangular dasher-frame 20, mounted for rotation in the churn body. The bevel-pinion 18 is connected to a rod 21, which passes downwardly through the tubular extension $20^a$ and through the rectangular dasher-frame 20, and bears at its lower end in the seat 7 on the bottom of the churn-body, whereby, as will be noted, the dasher-frame 20 and rod 21 will be rotated in opposite directions by the driving gearwheel 17, by reason of the location of the pinions at opposite sides of the center of said gearwheel. In the present instance the rectangular dasher-frame 20 is provided with blades $20^b$ which extend from the sides thereof at an upward angle toward the center of the frame, and the rod 21 is provided with similar blades $21^a$, which extend at a downward angle therefrom and rotate on a plane intermediate the blades

20$^b$, so that as the dashers are revolved in opposite directions they will thoroughly agitate the milk and cream to quickly form butter.

The bearing-sleeve 13, which is slidable upon and rotates with the driving-shaft 12, passes through the front upright 8$^a$ of the supporting-frame and has a ball-bearing therein, the anti-friction balls 22 being retained in place by a flanged collar 23. The sleeve has a collar 13$^a$, and a squared portion beyond, to which latter the crank-handle 24 may be applied. Keyed on the inner end of this sleeve is a pinion 25, which may be moved in and out of mesh with a large supplemental driving gearwheel 26, the latter being mounted in the upper extension of the supporting-frame on a shaft 27 journaled in suitable ball-bearings 28 and 29. In order to hold the pinion 25 either in or out of mesh with the driving gearwheel 26 we provide a latch-plate 30 pivoted on the upright 8$^a$ and adapted to engage at either side of the collar 13$^a$, the upright 8$^a$ being provided with a recess 8$^c$ to receive the collar when the sleeve is moved inward to dispose the pinion out of mesh with the driving gearwheel 26.

In the operation of the churn the milk and cream are agitated first by turning the shaft 27 so that the large bevel gearwheel 17 will be driven through the intervention of the large driving-gearwheel 26 and pinion 25, the parts being arranged as shown in Fig. 1 with the pinion 25 in mesh with said large driving-gearwheel 26 and the crank-handle in engagement with the shaft 27. By this arrangement, as will be seen, the dashers will be rotated rapidly by a comparatively slow motion of the crank-handle. Now when the butter begins to form, requiring additional power to turn the dashers the pinion 25 is slid out of mesh with the driving-gearwheel 26 and the crank-handle applied to the shaft 13—12 thereby applying the power directly to the bevel-gearwheel 17. It will also be noted that the particular construction of the dashers serve to effect a thorough agitation of the milk and cream by reason of the fact that the blades are disposed at an inclination so as to impart a stirring motion and the blades on one dasher pass those on the other in an opposite direction.

Having thus described our invention, we claim:

1. In a churn, the combination with rotatable dashers, of pinions connected to said dashers, a gearwheel in mesh with the pinions to rotate the dashers in opposite directions, a main shaft to which said gearwheel is fixed, a sleeve slidable on the shaft and having a squared outer end, a pinion fixed on the sleeve, a large gearwheel mounted above said pinion so as to mesh therewith, a shaft for the last mentioned gearwheel, and a crank-handle, substantially as shown and described.

2. In a churn, the combination with the body or barrel, of a supporting-frame mounted thereon and having a bearing-arm projecting inwardly from one side thereof, ball-bearings in the end of the arm, a main driving-shaft mounted at one end in said ball bearings, a sleeve slidable on said shaft and mounted in ball-bearings in the frame, a bevel gearwheel on the shaft, a pinion on the sleeve, and a large driving gearwheel with which the pinion is adapted to mesh; together with pinions in mesh with the bevel gearwheel at opposite sides of the center thereof, and rotatable dashers connected to said pinions, respectively, substantially as shown and for the purpose set forth.

3. In a churn, the combination with rotatable dashers, of pinions connected to said dashers, a large gearwheel in mesh with said pinions, a shaft for said gearwheel, a sleeve mounted in bearings and slidably connected to the shaft, a collar on said sleeve, and a latch-plate adapted to engage at either side of the collar; together with a pinion on the sleeve, a driving gearwheel with which said pinion is adapted to mesh, a shaft for the last mentioned gearwheel, and a crank-handle for turning the shafts, substantially as shown and described.

In testimony whereof we have signed our names to this specification in the presence of two subscribing witnesses.

WILLIAM P. EVERETT.
LOONEY N. EVERETT.
DAVID B. PATE.

Witnesses:
L. G. CABRA,
L. J. PATE.